United States Patent
Ozluturk (12) 
(10) Patent No.: US 6,714,614 B2
(45) Date of Patent: *Mar. 30, 2004

(54) SUBSCRIBER UNIT FOR GENERATING A STREAM CIPHER

(75) Inventor: Fatih M. Ozluturk, Port Washington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/201,831

(22) Filed: Jul. 23, 2002

(65) Prior Publication Data

US 2003/0026323 A1 Feb. 6, 2003

Related U.S. Application Data

(63) Continuation of application No. 09/685,156, filed on Oct. 10, 2000, now Pat. No. 6,430,246, which is a continuation of application No. 09/420,710, filed on Oct. 19, 1999, now Pat. No. 6,148,053, which is a continuation of application No. 08/949,027, filed on Oct. 10, 1997, now Pat. No. 6,009,135.

(51) Int. Cl.⁷ .............................................. H04L 23/00
(52) U.S. Cl. ...................... 375/377; 375/295; 375/316; 380/44; 380/255
(58) Field of Search ................................ 375/377, 259, 375/219, 295, 316; 380/44, 268, 270, 252, 42, 43, 255, 287, 37; 708/252, 254; 370/335, 342, 441

(56) References Cited

U.S. PATENT DOCUMENTS

| | | |
|---|---|---|
| 3,963,905 A | 6/1976 | Gopinath et al. |
| 4,202,051 A | 5/1980 | Davida et al. |
| 4,236,114 A | 11/1980 | Sasaki |
| 4,817,145 A | 3/1989 | Günther |
| 4,893,339 A | 1/1990 | Bright et al. |
| 4,905,262 A | 2/1990 | Eby |
| 5,091,942 A | 2/1992 | Dent |
| 5,148,485 A | 9/1992 | Dent |
| 5,195,136 A | 3/1993 | Hardy et al. |
| 5,230,020 A | 7/1993 | Hardy et al. |
| 5,237,615 A | 8/1993 | Snow |
| 5,361,302 A | 11/1994 | Malek et al. |
| 5,365,585 A | 11/1994 | Puhl et al. |
| 5,365,588 A | 11/1994 | Bianco et al. |
| 5,375,169 A | 12/1994 | Seheidt et al. |
| 5,412,665 A | 5/1995 | Gruodis et al. |
| 5,570,307 A | 10/1996 | Takahashi |

FOREIGN PATENT DOCUMENTS

| | | |
|---|---|---|
| EP | 0220437 | 5/1987 |
| GB | 2236934 | 4/1991 |
| WO | 8002349 | 10/1980 |

OTHER PUBLICATIONS

Kencheng Zeng: "Pseudorandom Bit Generators In Stream–Cipher Cryptography" Computer, vol. 24, No. 2, Feb. 1, 1991, pp. 8–17, XP000219462.

Lowy, et al., "A High Speed, Low Power Spread Spectrum Code Generator, Circuits and Systems", 1994, Proceedings of 37th Midwest Symposium, pp. 23–26, vol. 1.

*Primary Examiner*—Jean B. Corrielus
(74) *Attorney, Agent, or Firm*—Volpe and Koenig, P.C.

(57) ABSTRACT

One embodiment of the invention is a subscriber unit for transmitting communication signals. The subscriber unit comprises a cipher stream generator which generates a cipher stream to encipher a digital data stream. A data stream mixer mixes the cipher stream with the digital data stream. An antenna radiates the mixed cipher and data stream as a communication signal. Another embodiment of the invention is a subscriber unit for receiving communication signals. The subscriber unit comprises a cipher stream generator for generating a cipher stream with the received communication signal to produce a decoded data stream. The cipher steam generator includes first and second linear feedback shift registers. Each has a clock input and an output. The outputs are combined to generate the cipher stream. The output of the second register is combined with a clock signal which is inputted to the clock input to the first register.

8 Claims, 7 Drawing Sheets

SUBSCRIBER UNIT FOR GENERATING A STREAM CIPHER

This application is a continuation of U.S. application Ser. No. 09/685,156, filed on Oct. 10, 2000, now U.S. Pat. No. 6,430,246, which is a continuation of U.S. application Ser. No. 09/420,710 filed Oct. 19, 1999, now U.S. Pat. No. 6,148,053, which is a continuation of U.S. application Ser. No. 08/949,027, filed Oct. 10, 1997, now U.S. Pat. No. 6,009,135.

BACKGROUND OF THE INVENTION

1. Field of the Invention

This invention generally relates to secure transmission of digital voice and data communications. More particularly, the invention relates to a stream cipher with a plurality of linear feedback shift registers generating large pseudo-random bit sequences and having multiple security keys.

2. Description of the Prior Art

Code division multiple access (CDMA) is a type of spread-spectrum communication system wherein each subscriber unit is distinguished from all other subscriber units by the possession of a unique code. In order to communicate with a particular subscriber unit, a transmitter unit imprints the unique code upon transmission and the receiver uses the same code to decode the transmission.

The unique codes used by a CDMA communication system to transmit voice and data communications appear noise-like and random. Since the random sequences are generated by standard deterministic logic elements, the generation of the bit sequences are predictable and repeatable. It is the use of these repeatable binary random sequences that permits easy modulation with any information-bearing signal. These predictable random sequences are called pseudo-random sequences.

Each transmitter within a CDMA communication system includes a stream cipher generator which uses a key to encipher the voice and data communications. An identical stream cipher generator at the receiver deciphers the received enciphered communications using the same key.

As is well known in the prior art, the simplest stream cipher generator is the linear feedback shift register. A shift register of a finite bit length is clocked at a fixed rate. An exclusive-OR (XOR) gate generates the serial input signal from the XOR combination of some bits of the shift register. The circuit then proceeds through a set of states, eventually repeating itself after a finite number of clock pulses. However, the stream cipher generated by linear feedback shift register is related to the length of the shift register and which bits are combined in the XOR to generate the next input. If a complex stream cipher is desired, an expensive shift register having a cumbersome length must be used.

Accordingly, there is a need for a simple method of increasing the complexity of stream ciphers to increase security of enciphered messages.

SUMMARY OF THE INVENTION

One embodiment of the invention is a subscriber unit for transmitting communication signals. The subscriber unit comprises a cipher stream generator which generates a cipher stream to encipher a digital data stream. A data stream mixer mixes the cipher stream with the digital data stream. An antenna radiates the mixed cipher and data stream as a communication signal.

Another embodiment of the invention is a subscriber unit for receiving communication signals. The subscriber unit comprises a cipher stream generator for generating a cipher stream with the received communication signal to produce a decoded data stream.

The cipher steam generator includes first and second linear feedback shift registers. Each has a clock input and an output. The outputs are combined to generate the cipher stream. The output of the second register is combined with a clock signal which is inputted to the clock input to the first register.

DESCRIPTION OF THE PREFERRED EMBODIMENTS

The preferred embodiments are described with reference to drawing figures wherein like numerals represent like elements throughout.

Figure 1:
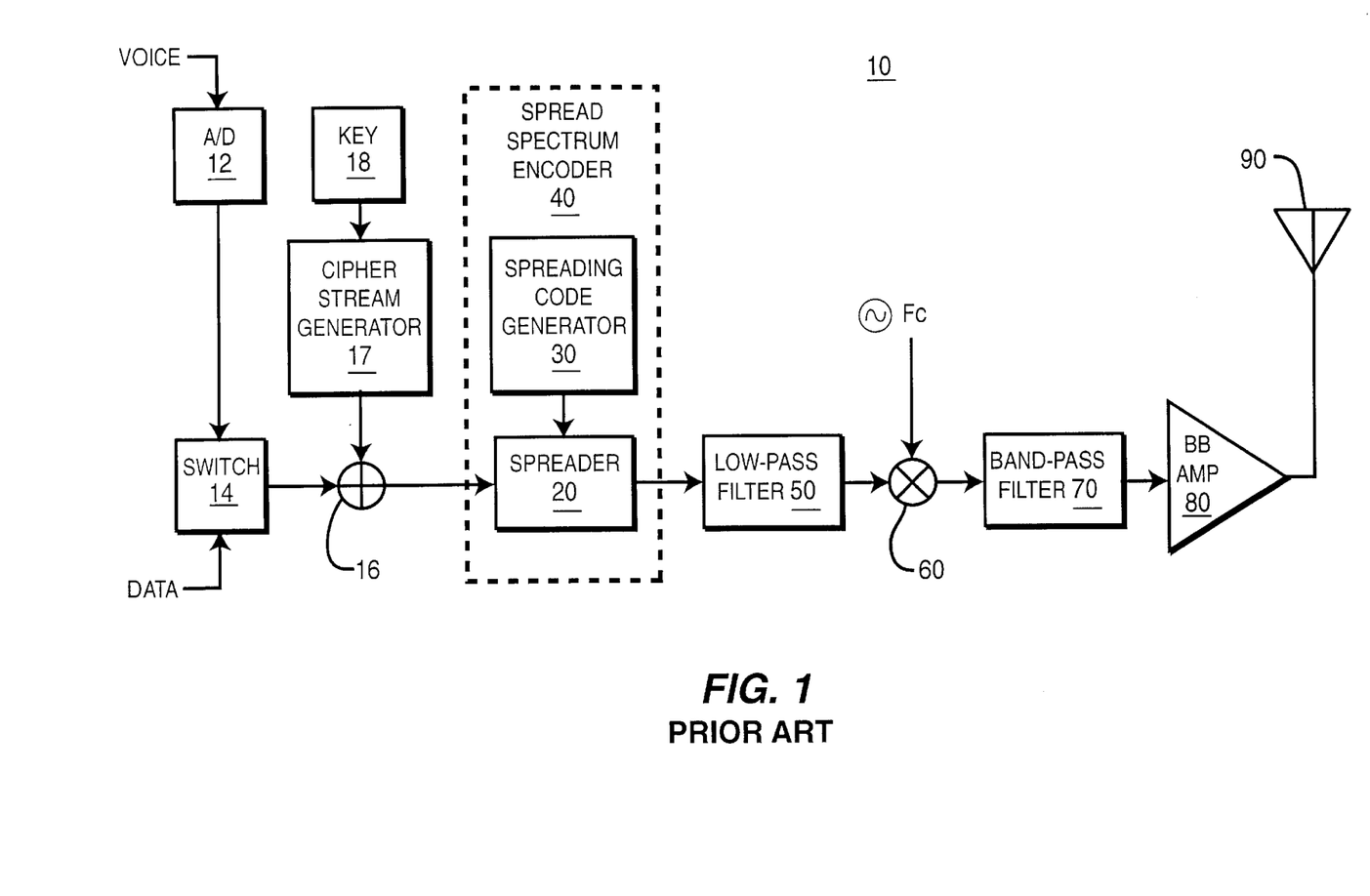
FIG. 1 is a block diagram of a conventional spread spectrum transmitter.

A typical prior art spread spectrum transmitter 10, as shown in FIG. 1, includes an analog-to-digital (AID) converter 12 and a switch 14. The A/D converter 12 receives an analog voice signal, digitizes the signal and outputs the digitized signal to the switch 14. The switch 14 receives the digital voice signal from the A/D converter 12 and a digital data signal from a data terminal (not shown). It should be readily understood by those of skill in the art that the data terminal may comprise a facsimile machine, a computer or any other type of electronic device that can send or receive digital data. The switch 14 connects the spread spectrum transmitter 10 with an input for either digital voice data or digital data. The digital voice data and digital data are hereafter collectively referred to as digital data.

A mixer 16 combines data from the switch 14 to the cipher stream generated by the cipher stream generator 17, which has at least one key 18. After combining the cipher stream to the data, the mixer 16 outputs the enciphered digital data to a spreader 20, which may be a mixer. A pseudo-random sequence generated by pseudo-random sequence generator 30 is applied to a first terminal of the spreader 20. The pseudo-random sequence generator 30 and the spreader 20 are shown as being contained within a spread spectrum encoder 40.

The spreader 20 performs a frequency spectrum spreading function by multiplying the data by the pseudo-random sequence in the time domain, which is equivalent to convolving the bimodal spectrum of the data sequence with the approximately rectangular spectrum of the pseudo-random sequence in the frequency domain. The output of the spreader 20 is applied to a low-pass filter 50, whose cutoff frequency is equal to the system chip rate, Fcr. The output of the low-pass filter 50 is then applied to one terminal of a mixer 60 and up-converted, as determined by the carrier frequency Fc which is applied to its other terminal. The up-converted signal is then passed through a band-pass filter 70. The filter 70 has a bandwidth equal to twice the chip rate and a center frequency equal to the center frequency of the spread spectrum system's channel bandwidth. The output of the filter 70 is applied to the input of an RF amplifier 80, whose output drives an antenna 90.

Figure 2:
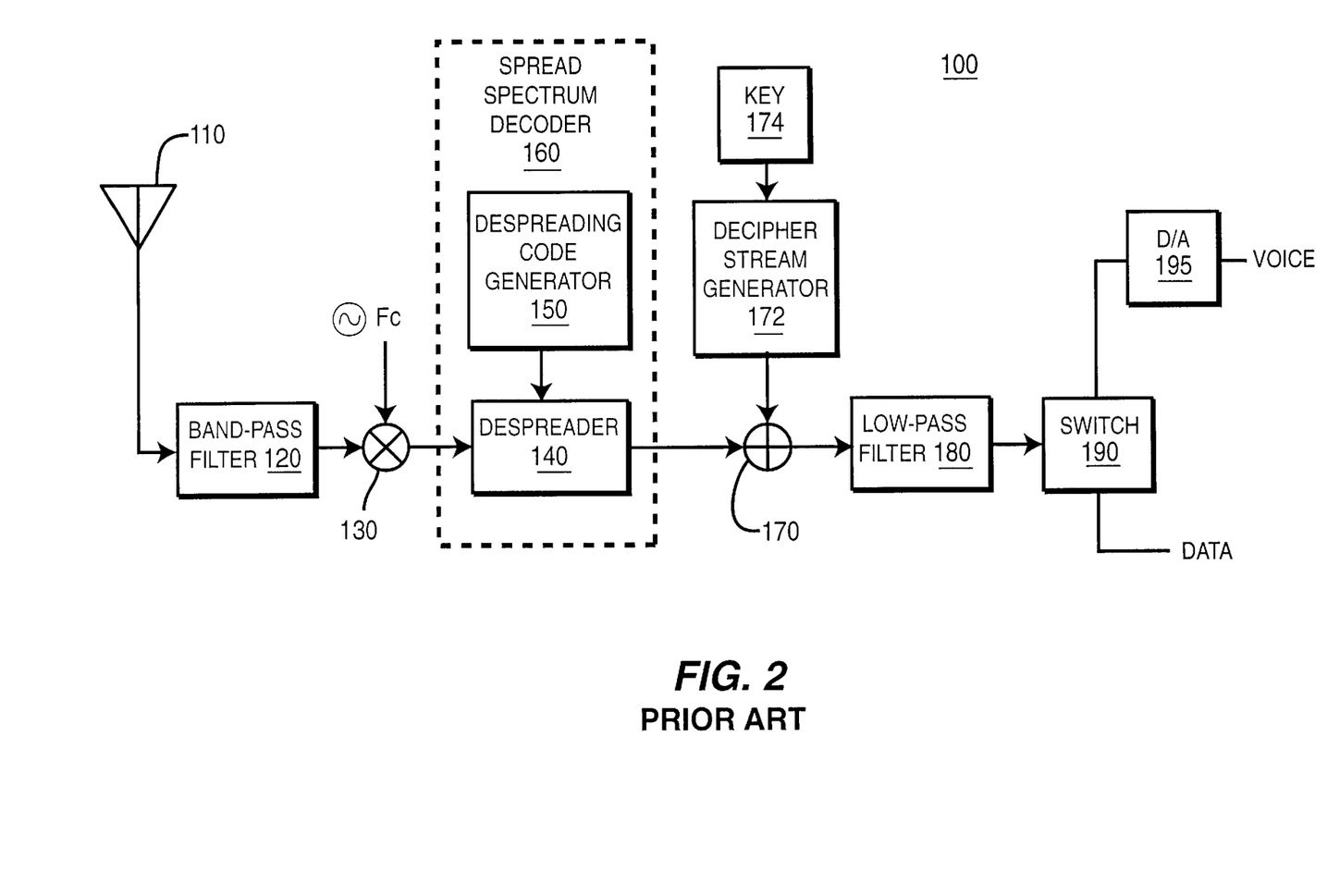
FIG. 2 is a block diagram of a conventional spread spectrum receiver.

A prior art spread spectrum receiver 100 is shown in FIG. 2. An antenna 110 receives the transmitted spread spectrum signal, which is filtered by a bandpass filter 120. The filter has a bandwidth equal to twice the chip rate, and a center frequency equal to the center frequency of the spread spectrum system's channel bandwidth. The output of the filter 120 is subsequently down-converted by a mixer 130, possibly in two stages, to a baseband signal using a local oscillator having a constant frequency which is approximately the same as the carrier frequency Fc of the transmitter 10. The output of the mixer 130 is then despread by applying it to a first terminal of the despreader 140 while applying the same or similar pseudo-random sequence as delivered to the spreader 20 to a second terminal of the despreader 140. The pseudo-random sequence is generated by a despreading code generator 150. The despreader 140 and the despreading code generator 150 are contained within a spread spectrum decoder 160 as shown in FIG. 2.

More particularly, it will be appreciated that the pseudo-random sequence used in the receiver 100 of a spread spectrum communication system must be synchronized with the pseudo-random sequence used in the transmitter 10. The output of the despreader 140 is applied to a mixer 170. The decipher stream generator 172 generates the same cipher stream as the cipher stream generator 17 to decipher the enciphered digital data. In the prior art, the key 18 used in the transmitter 10 is the same as the key 174 used in the receiver 100. The receiving key 174 is applied to the cipher stream generator 172 to decipher the enciphered digital data. The output of the mixer 170 is applied to a low-pass filter 180, which has a cutoff frequency at the data rate of the data input to the spread spectrum transmitter 10. The output of the low-pass filter 180 is a replica of the voice or digital data input as shown in FIG. 1.

Figure 3:
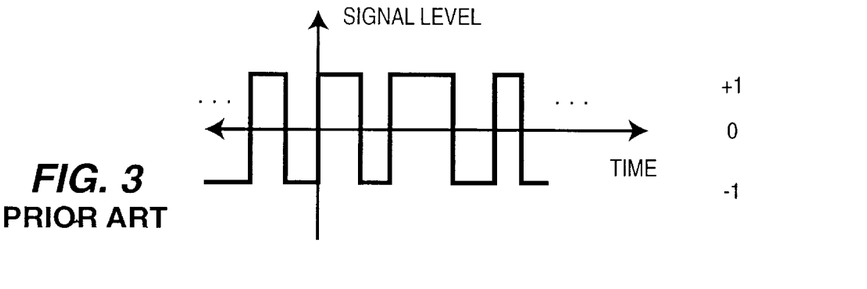
FIG. 3 is a timing diagram of a pseudo-noise (PN) sequence used in FIGS. 1 and 2.
Figure 4:
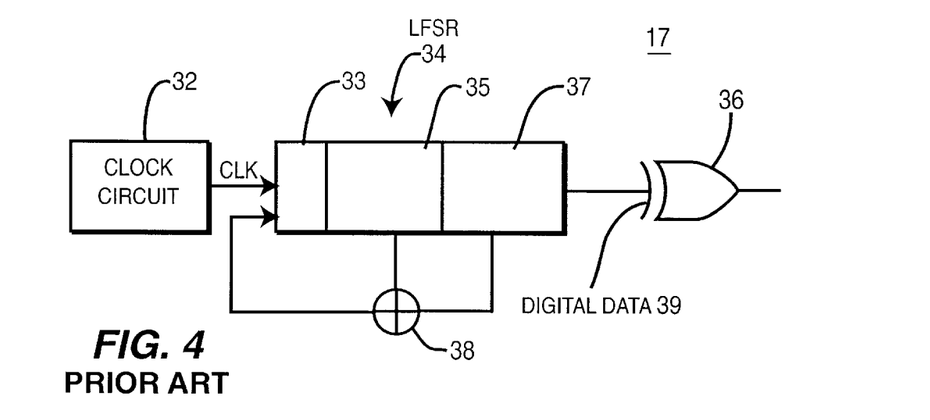
FIG. 4 is a diagram showing a conventional cipher stream generator.

A conventional spreading sequence is a pseudo-random digital sequence as shown in FIG. 3. The sequence typically attains two constant values over time, (±1). The sequence is used to spread the signal being transmitted and to despread the signal being received. The stream cipher is generated by a cipher stream generator 17, as shown in FIG. 4. An enciphered data stream can be deciphered if the key 18 to the original cipher stream is known and is duplicated at the receiver. The bits are generated by the cipher stream generator 17 and the data bits are XOR'ed to encipher the data. The original data stream is recovered when the enciphered data is XOR'ed with the same cipher stream as shown by Equation 1:

$$b_i \oplus c_i \oplus c_i = b_i \quad \text{Equation (1)}$$

where $b_i$ is the original data stream and $c_i$ is the original cipher stream.

As is well known in the prior art, the simplest cipher stream generator 17 is the linear feedback shift register 34. The shift register 34 comprises a finite number of bits, 33, 35, 37, or finite bit length, which is clocked by a clock circuit 32 at a predetermined fixed rate. A combination of LFSR bits 35, 37 are XOR'ed to generate the next input bit to the LFSR 34 by XOR gate 38. Coefficients of a primitive polynomial determine which bits to XOR. An XOR 36 gate combines the output of the LFSR 34 and the digital data stream 39 to encipher the data. The LFSR 34 then goes through a set of states eventually repeating itself after a finite number of clock pulses supplied by clock circuit 32. A conventional three bit LFSR 34 is an example of a cipher stream generator 17 as shown in FIG. 4. An n-bit shift register has a period of $2^n - 1$. Accordingly, for the three bit shift register 34, the period is seven. Each initial value of zero or one loaded into each bit of register 34 forms a key, except for all zeros. For example, if the key is 111, the shift register 34 will generate the following values:

| Initial loading → | 111 |
|---|---|
| | 011 |
| | 001 |
| | 100 |
| | 010 |
| | 101 |
| | 110 |
| Repeat → | 111 |
| | 011 |
| | . |
| | . |
| | . |

The three bit LFSR 34, as shown above, has a very small period (i.e. seven). Accordingly, a LFSR of this size does not provide very secure transmission of data.

Figure 5:
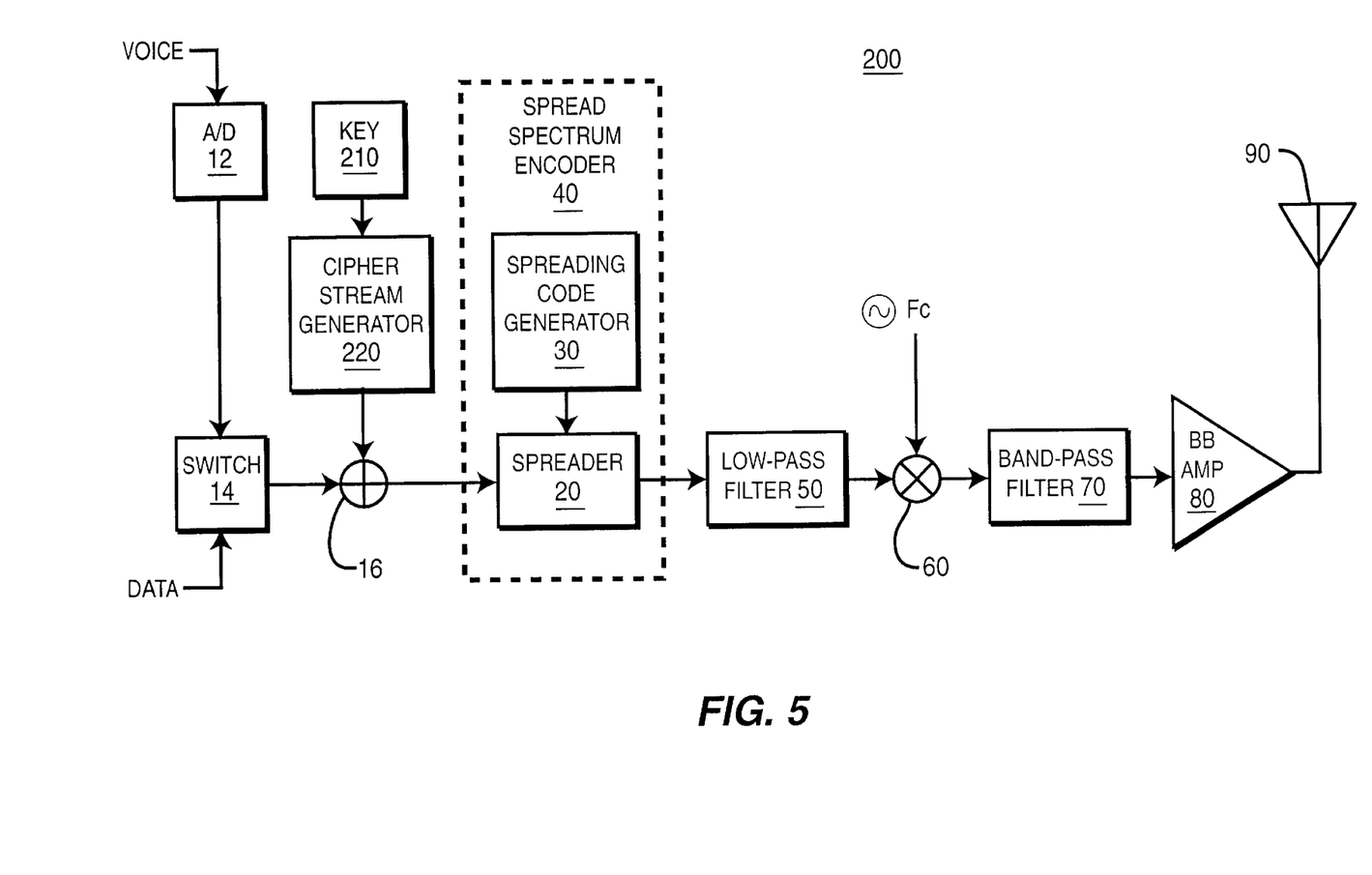
FIG. 5 is a block diagram of an embodiment of the spread spectrum transmitter of the present invention.

A spread spectrum transmitter 200 made in accordance with the present invention is shown in FIG. 5. The transmitter 200 includes all of the components of the spread spectrum transmitter 10 shown in FIG. 1, which function in the same manner except for the cipher stream generator 220 and keys 210 which will be explained in further detail hereinafter. Although FIG. 5 shows a transmitter 200 for transmitting one channel, multiple channels may be combined and then enciphered by cipher stream generator 220.

Figure 6:
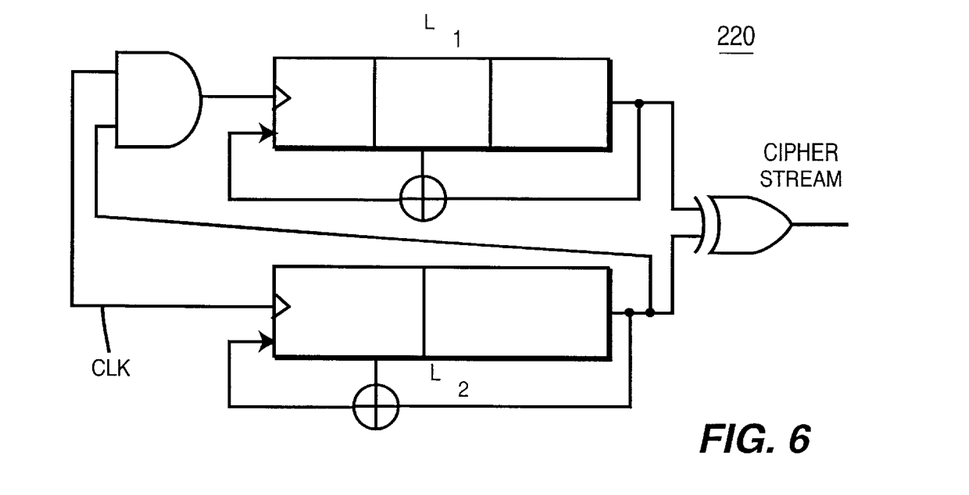
FIG. 6 is a block diagram of a first embodiment of cipher stream generator of the present invention.

Referring to FIG. 6, the cipher stream generator 220 includes two LFSR circuits, ($L_1$, $L_2$). The output of the second LFSR circuit $L_2$ is used to control the clock of the first LFSR circuit, $L_1$. For example, the output of the second LFSR $L_2$ is preferably connected to an AND gate 222, which is connected to the clock input of the first LFSR $L_1$. The AND gate 222 could be replaced by a NAND gate. Other gates such as OR, NOR, XOR, etc. or a combination of gates may also be used in place of the AND gate 222. Exclusive-OR gates 38 provide feed back to shift registers $L_1$, $L_2$. The cipher stream generator 220 also includes an exclusive-OR gate 224, which is connected to the outputs of the LFSRs $L_1$, $L_2$. The exclusive-OR gate 224 combines the outputs of the LFSRs $L_1$, $L_2$ and then outputs the cipher stream. The initial states of the two LFSRs $L_1$, $L_2$ are the two keys that are shared between the cipher stream generator 220 and decipher stream generator 320. The decipher stream generator 320, which will be explained in more detail hereinafter, is preferably the same as the cipher stream generator 220. The cipher stream generator 220 and decipher stream generator 320 are preferably used in synchronous mode (as opposed to self-synchronous mode) because the self-synchronous mode is subject to error propagation due to single bit errors common in wireless transmission. In self-synchronous stream ciphers, the enciphered digital data is used as a part of the key for enciphering the following data bits. The problem with this approach is that if a bit is corrupted during transmission and it is deciphered incorrectly, it corrupts the following bits as well since it is also used as the cipher key for the following data bits.

All ciphering schemes other than a one time lookup table are periodic. In order to send a secure transmission, the cipher stream generator 220 and decipher stream generator 320 should have as long a period as practical. The two LFSRs $L_1$, $L_2$ generate the maximum period if the tap coefficients of the feedback correspond to a primitive polynomial. Such a sequence is called a maximum length sequence (m-sequence).

Although it is not required, in one embodiment, the maximum period is obtained when the periods of the individual outputs of the two LFSRs $L_1$, $L_2$ are relatively prime (the periods of the individual outputs do not have a common factor). For example, if the first LFSR $L_1$ has a bit length of three, the individual output period is seven. If the second LFSR $L_2$ has a bit length of two, the individual output period is three. Therefore, the output periods do not have the same common factor.

A primitive polynomial, which is well known in finite field algebra, generates a period $2^L-1$ if it is of degree L. A set of polynomials form a finite field. A finite field has at least one primitive element such that all nonzero elements of the field are powers of this primitive element. A polynomial that has a primitive element as a root is called a primitive polynomial. Therefore, when the LFSR circuits $L_1$, $L_2$ have lengths $L_{E1}$ and $LE_{E2}$ respectively, the output of both the cipher stream generator 220 and decipher stream generator 320 have the period:

$$\text{Output period} \approx 2\, L_{E1}+L_{E2} \qquad \text{Equation (2)}$$

When lengths of the two LFSRs $L_1$, $L_2$ are in the order of ~20, the period of the stream cipher is ~$10^{12}$ bits. This means that a 32 kbits/sec data stream can be encrypted continuously for over a year without repeating the stream cipher.

The linear complexity of the cipher stream generator 220 is the length of the shortest LFSR that can generate the output of the cipher stream generator 220. It is often used as a measure of randomness of the cipher stream generator 220 output. The linear complexity of this cipher stream generator 220 is in the order of $$\text{Linear complexity} \approx (2^{L_{E1}})L_{E2}+(2^{L_{E2}})L_{E1}i \qquad \text{Equation (3)}$$

If the output of the cipher stream generator 220 were to be repeated using a single equivalent LFSR, the register would have to be over 20 million stages long (for $L_{E1}$ and $L_{E2}$~20 as above).

A cipher stream generator 220 is called balanced if its output is the same as the output of each internal LFSR circuit $L_1$, $L_2$ with the same probability. Preferably, the output value should be the same as the output of either one of the LFSR circuits $L_1$, $L_2$, i.e. a probability of 0.5. It is important to have a cipher that is balanced because it is easier to break ciphers that are not balanced. If the combinations of the outputs of the LFSR circuits $L_1$, $L_2$ and the output of the cipher stream generator 220 are considered, it can be seen that the cipher stream is perfectly balanced and is the same as each LFSR $L_1$, $L_2$ output half of the time.

The initial state of the cipher stream generator 220 is determined by the two keys $K_1$ and $K_2$, which are the initial states of the two LFSRs $L_1$, $L_2$ respectively. To protect against insertion attacks, the keys $K_1$ and $K_2$ should be changed often, (preferably at least once every period of the cipher). The more combinations for the keys $K_1$ and $K_2$, the more secure the transmission. The number of key combinations in this example is $$\text{Key combinations} \approx 2L_{E1}+L_{E2} \qquad \text{Equation (4)}$$

which is an extremely large number.

The cipher stream generator 220 of the present invention has the following advantages: 1) it has a very large linear complexity; 2) it has a very large period; 3) its output is balanced with respect to the outputs of the two LFSR circuits $L_1$, $L_2$; 4) it is implemented with minimal hardware; and 5) it takes two keys $K_1$ and $K_2$ which increases its security.

For example, as shown in FIG. 6, it is assumed that the first LFSR circuit $L_1$ has a bit length of 3 and the second LFSR circuit $L_2$ has a bit length of 2. Further, it is assumed that key $K_1$ is "111" and key $K_2$ is "11." The keys $K_1$ and $K_2$ are loaded into $L_1$ and $L_2$ respectively. Table 1 below provides the states of the LFSR circuits $L_1$, $L_2$; the outputs of the LFSR circuits $L_1$, $L_2$; and the cipher stream for several consecutive clock cycles.

TABLE 1

| Clock Cycle | $L_1$ state | $L_2$ state | Output of $L_1$ | Output of $L_2$ | Cipher Stream |
|---|---|---|---|---|---|
| 1 | 111 | 11 | 1 | 1 | 0 |
| 2 | 011 | 01 | 1 | 1 | 0 |
| 3 | 001 | 10 | 1 | 0 | 1 |
| 4 | 001 | 11 | 1 | 1 | 0 |
| 5 | 100 | 01 | 0 | 1 | 1 |
| 6 | 010 | 10 | 0 | 0 | 1 |
| 7 | 010 | 11 | 0 | 1 | 1 |
| 8 | 101 | 01 | 1 | 1 | 0 |
| 9 | 110 | 10 | 0 | 0 | 1 |
| 10 | 110 | 11 | 0 | 1 | 1 |
| 11 | 111 | 01 | 1 | 1 | 0 |
| 12 | 011 | 10 | 1 | 0 | 1 |
| 13 | 011 | 11 | 1 | 1 | 0 |
| 14 | 001 | 01 | 1 | 1 | 0 |
| 15 | 100 | 10 | 0 | 0 | 1 |
| 16 | 100 | 11 | 0 | 1 | 1 |
| 17 | 010 | 01 | 0 | 1 | 1 |
| 18 | 101 | 10 | 1 | 0 | 1 |
| 19 | 101 | 11 | 1 | 1 | 0 |
| 20 | 110 | 01 | 0 | 1 | 1 |
| 21 | 111 | 10 | 1 | 0 | 1 |
| | | end of one period | | | |
| 22 | 111 | 11 | 1 | 1 | 0 |
| 23 | 011 | 01 | 1 | 1 | 0 |
| 24 | 001 | 10 | 1 | 0 | 1 |
| 25 | 001 | 11 | 1 | 1 | 0 |

From Table 1, the period of the cipher stream is 21 clocks, which is a multiplication of the individual periods of the LFSR circuits $L_1$(7) and $L_2$(3).

Figure 7:
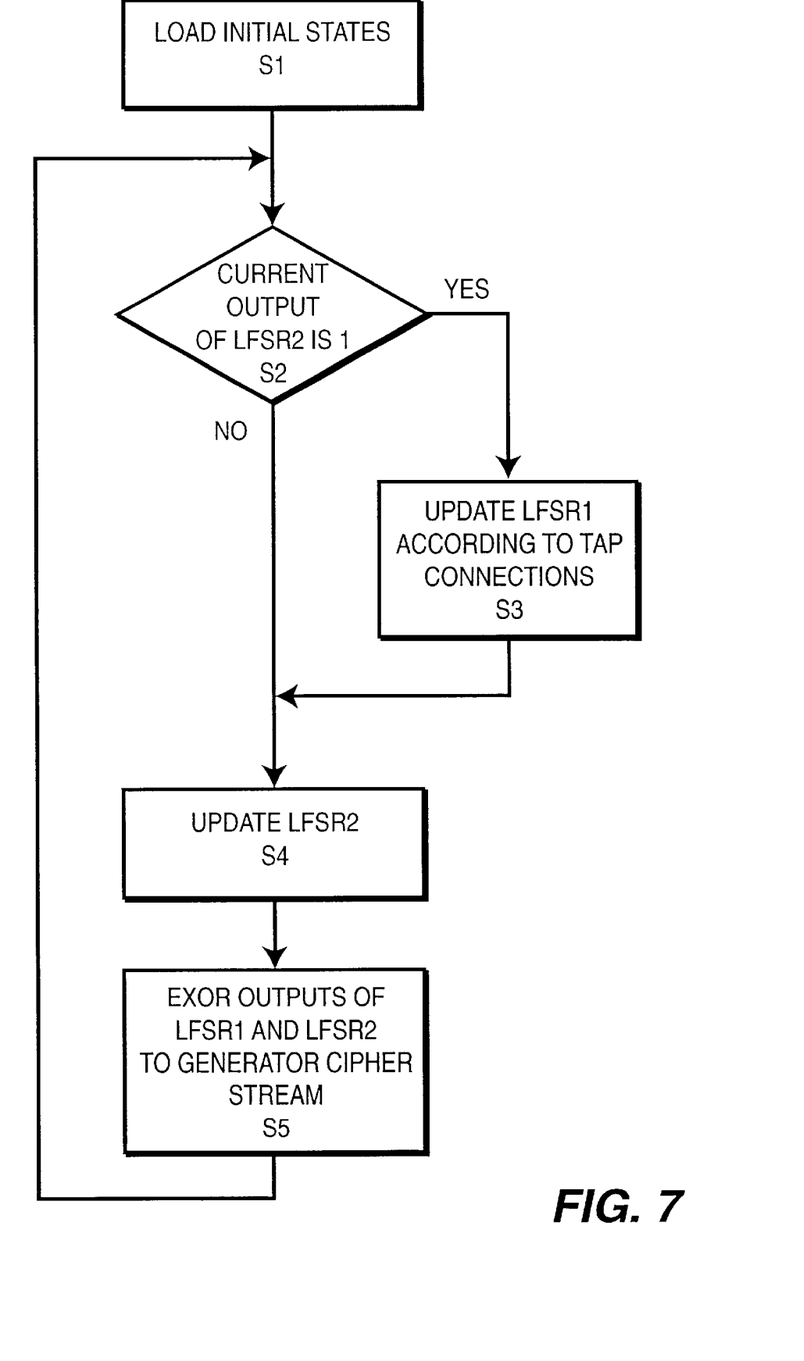
FIG. 7 is a flow chart of the steps for generating a cipher stream in the first embodiment of the present invention.

The cipher stream may also be generated using software as shown in the flow diagram of FIG. 7. The initial states, which are the two keys $K_1$ and $K_2$, are loaded into registers or memory locations (S1). If the current output of the second LFSR circuit $L_2$ is "1"(S2), the value of the first LFSR circuit $L_1$ is updated (S3), and then the second LFSR circuit $L_2$ is updated (S4). However, if the current output of LFSR circuit $L_2$ is zero (S2), then the LFSR circuit $L_1$ is not updated and only LFSR circuit $L_2$ is updated (S4). The outputs of the LFSR circuits $L_1$, $L_2$ are then forwarded to an XOR gate, which outputs the cipher stream (S5). Steps (S2) through (S5) are then repeated.

Figure 8:
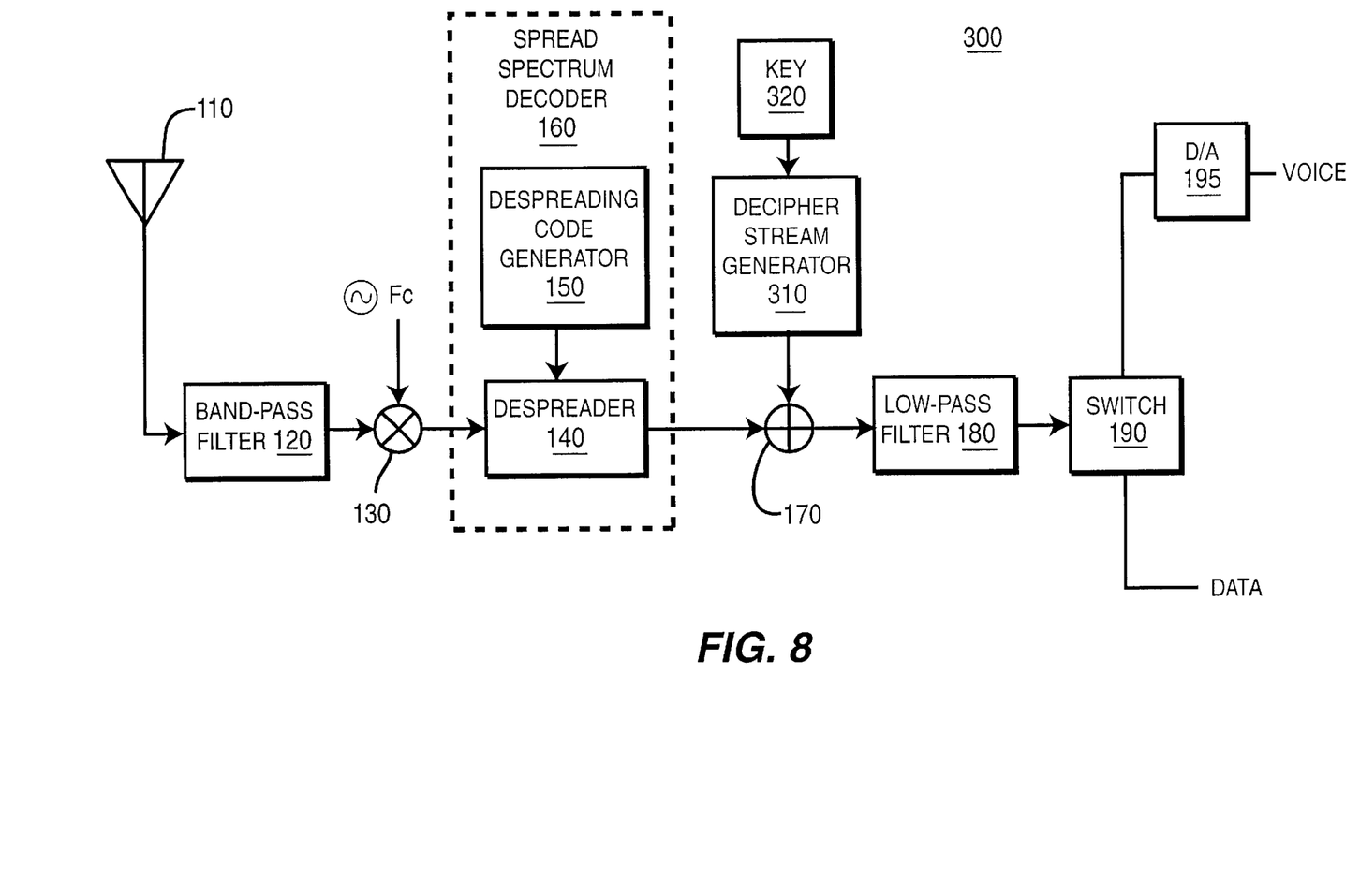
FIG. 8 is a block diagram of an embodiment of the spread spectrum receiver of the present invention.

A spread spectrum receiver 300 made in accordance with the present invention as shown in FIG. 8 includes all of the components of the spread spectrum receiver 100 of FIG. 2, which function in the same manner, except for the decipher stream generator 310 and the keys 320.

Figure 9:
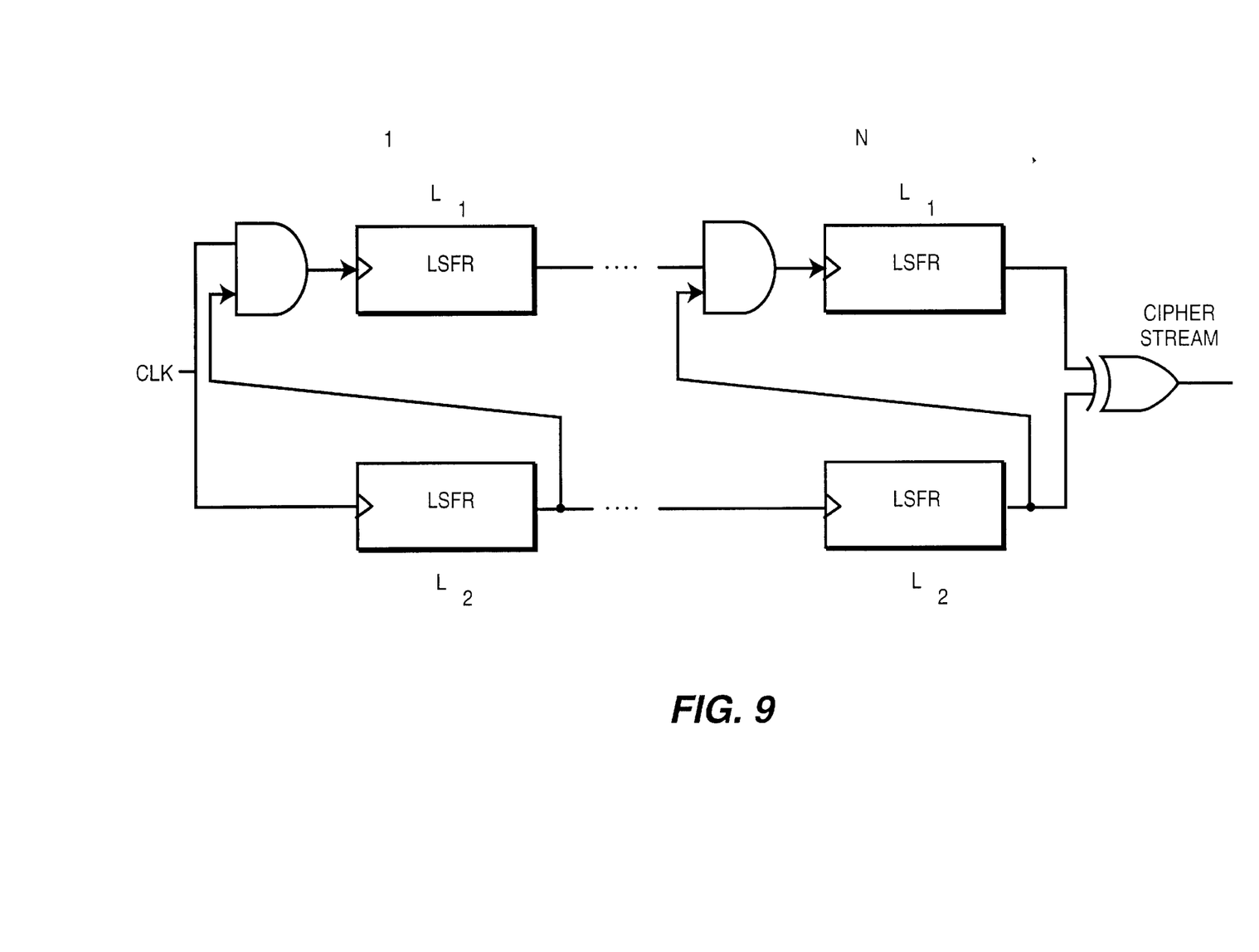
FIG. 9 is a second embodiment of the cipher stream generator of the present invention.

The cipher stream generator 220 or the decipher stream generator 320 can be used in a multiple stage configuration, as shown in FIG. 9, in which case the security is greatly enhanced since the linear complexity and period increase exponentially.

If $L_1 \sim L_2 \sim L$, then the linear complexity of the multiple stage configuration with N stages is approximately $\approx 2L2^{LN}$ and the period of the output becomes approximately $\approx 2^{2LN}$. The stream cipher algorithm explained above can be used in a cascade structure as in FIG. 9 to further increase its security. Each stage may have the same bit length or the stages may have different bit lengths. In cascade form, prior stages generate clocks for the following stages. As shown in FIG. 9, the output of the first LFSR circuit $L_1$ from stage 1 and the output of the second LFSR circuit $L_2$ from stage 2 are coupled to an AND gate to form a digital signal which is used as the clock for the first LFSR circuit $L_1$ of stage 2. Similarly, output of the second LFSR circuit $L_2$ from stage 1 becomes the clock for the second LFSR circuit $L_2$ of stage 2. More stages can be added in the same manner. An LFSR is clocked when the signal in its clock input changes from 0 to 1. Although the LFSRs $L_1$, $L_2$ at each stage preferably have the same bit length, they may also be different.

Although the invention has been described by making detailed reference to certain specific embodiments, such details are intended to be instructive rather than restrictive. It will be appreciated by those skilled in the art that many variations may be made in a structure and mode of operation without departing from the spirit and scope of this invention as disclosed in the teachings herein.

What is claimed is:

1. A subscriber unit for transmitting communication signals comprising:

a cipher stream generator which generates a cipher stream to encipher a digital data stream;

a data stream mixer, which mixes the cipher stream with the digital data stream;

the cipher stream generator includes first and second linear feedback shift registers, each having a clock input and an output; the outputs being combined to generate said cipher stream and the output of said second register being combined with a clock signal which is inputted to the clock input of said first register; and an antenna for radiating the mixed cipher and data stream as a communication signal.

2. The subscriber unit of claim 1, wherein the first and second registers have different lengths.

3. The subscriber unit of claim 1, wherein the output of the first linear feedback shift register and the output of the second linear feedback shift register is combined by an exclusive-OR gate.

4. The subscriber unit of claim 1, wherein the first linear feedback shift register receives the output of the second linear feedback shift register by way of an AND gate or a NAND gate.

5. A subscriber unit for receiving spread communication signals comprising:

an antenna for receiving a communication signal;

a cipher stream generator for generating a cipher stream to decipher the received communication signal;

a mixer for associating the cipher stream with the received communication signal to produce a decoded data stream; and the cipher stream generator includes first and second linear feedback shift registers, each having a clock input and an output; the outputs being combined to generate the cipher stream and the output of the second register being combined with a clock signal which is inputted to the clock input of the first register.

6. The subscriber unit of claim 5, wherein the first and second registers have different lengths.

7. The subscriber unit of claim 5, wherein the output of the first linear feedback shift register and the output of the second linear feedback shift register is combined by an exclusive-OR gate.

8. The subscriber unit of claim 5, wherein the first linear feedback shift register receives the output of the second linear feedback shift register by way of an AND gate or a NAND gate.

* * * * *

UNITED STATES PATENT AND TRADEMARK OFFICE
CERTIFICATE OF CORRECTION

PATENT NO. : 6,714,614 B2
DATED : March 30, 2004
INVENTOR(S) : Faith M. Ozluturk It is certified that error appears in the above-identified patent and that said Letters Patent is hereby corrected as shown below:

Column 2,
Line 4, after "cipher", delete "steam" and insert -- stream --.

Column 5,
Line 33, delete "Output period≈2 $L_{E1}+L_{E2}$", and insert -- *Output period* $\approx 2^{L_{E1}+L_{E2}}$ --.

Line 45, delete "Linear complexity≈$(2^{LE1})L_{E2}+(2^{LE2})L_{E1}i$", and insert -- *Linear complexity* $\approx \left(2^{L_{E1}}\right)L_{E2} + \left(2^{L_{E2}}\right)L_{E1}$ --.

Column 6,
Line 4, delete "Key combinations≈$2L_{E1}+L_{E2}$" and insert -- *Key combinations* $\approx 2^{L_{E1}+L_{E2}}$ --.

Signed and Sealed this

Seventh Day of February, 2006

JON W. DUDAS
*Director of the United States Patent and Trademark Office*